United States Patent [19]
Ljung et al.

[11] 3,913,405
[45] Oct. 21, 1975

[54] ANGULAR DIRECTION SENSOR

[75] Inventors: Bo H. G. Ljung, Wayne; John C. Stiles, Morris Plains, both of N.J.

[73] Assignee: The Singer Company, Little Falls, N.J.

[22] Filed: Aug. 16, 1974

[21] Appl. No.: 498,035

[52] U.S. Cl. ............................................. 73/505
[51] Int. Cl.² ..................................... G01C 19/56
[58] Field of Search ............ 73/505, 517 AV; 310/25

[56] References Cited
UNITED STATES PATENTS
2,514,250   7/1950   Meredith ........................ 73/505 X
3,302,465   2/1967   Mathey .............................. 73/505

FOREIGN PATENTS OR APPLICATIONS
1,176,197   11/1958   France .............................. 73/505

Primary Examiner—James J. Gill

[57] ABSTRACT

A angular direction sensor formed of a casing and an elongated vibrating element. The vibrating elastic element, such as a rod, is secured at each end to the casing by a flexible connection and is furthermore rigidly connected to vibrating members, providing linear inertial momentum. The linear inertial momentum is obtained by symmetrically arranged members secured to the vibrating element so that the nodal points of the vibrating element are exterior to the same and coincident with the flexible connections to the case.

9 Claims, 6 Drawing Figures

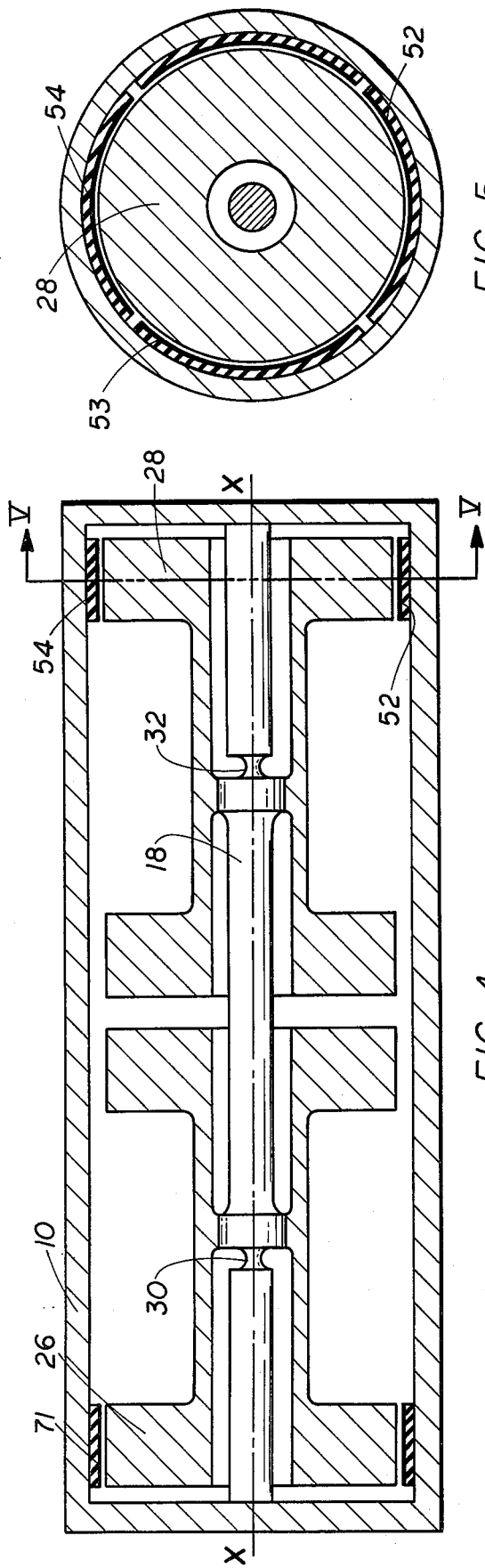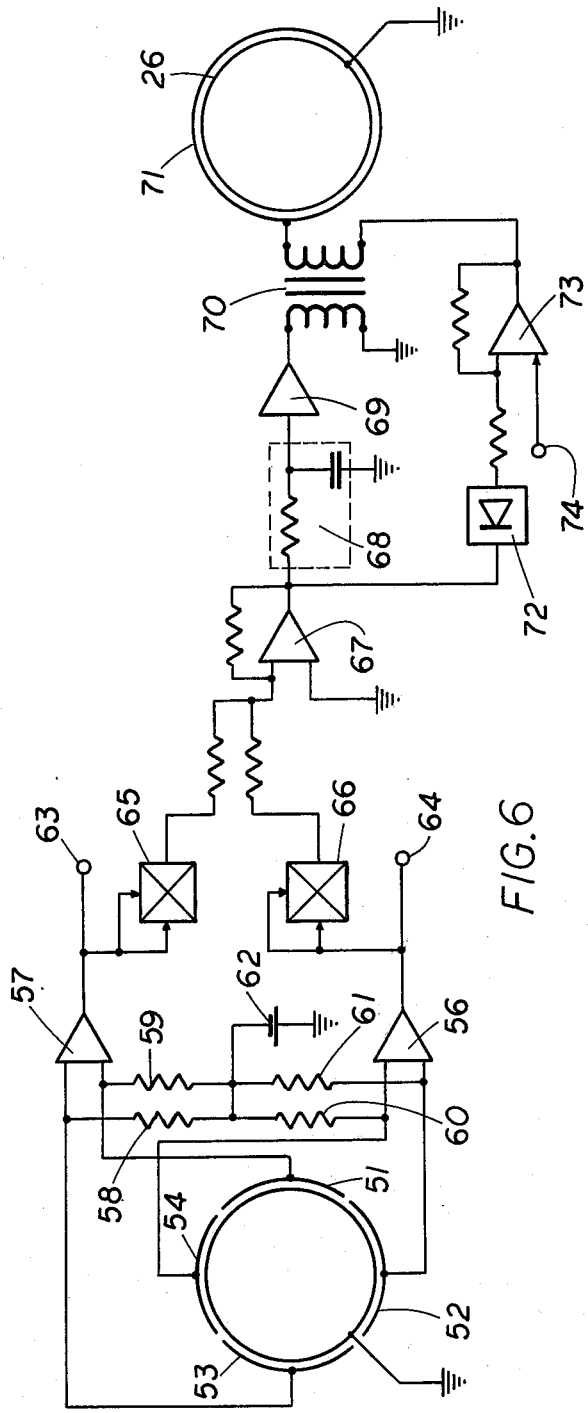
FIG. 5
FIG. 4
FIG. 6

ANGULAR DIRECTION SENSOR

BACKGROUND OF THE INVENTION

The present invention relates to an angular reference apparatus and particularly to a new and improved vibrating gyroscope.

Conventional gyroscopes have many limitations due to their complexity and due to the finite life of the bearings used to suspend the rotating flywheels. Attempts to eliminate wear in the bearing have led to the development of hydrodynamic and electrostatic bearings. These are however very costly and quite complex. Attempts have been made to eliminate rotating parts entirely and replace the same with vibrating elements. These have, however, an output signal proportional to the input angular velocity with noise and dynamic range unsuitable for inertial navigationsl systems.

It is the primary object of the present invention to provide an inexpensive, simple and reliable angular displacement gyroscope particularly suitable for inertial and other navigational systems.

It is an object of this invention to provide angular displacement sensor in which a symmetrical vibrating element is employed.

It is a further object of the present invention to provide a device of the type described in which the vibrating element is insensitive to outside disturbances, noise, etc. and itself has no vibrating effect on the outside environment.

It is a further object of the present invention to provide a device of the type described having a vibrating element with very low damping.

It is a further object of the invention to provide a novel and improved device of the type described in which its elastic and inertial elements are separately adjustable permitting an unrestricted adjustment capability of the sensor.

These objects, as well as others, together with numerous advantages of the present invention, will be seen from the following disclosure.

SUMMARY OF THE INVENTION

According to the present invention, an angular direction sensor is provided comprising a casing in which an elongated vibrating element is secured. The vibrating element is secured at each end to a casing by a flexible connection and is furthermore rigidly connected to vibrating members, providing a linear inertial momentum. The vibrating members are attached in such a way that the nodal points of the vibrating structure are exterior of the vibrating elements. Means are provided to sense the plane of the vibration with respect to the casing.

In one form of the invention the vibrating elastic element is comprised of a rod, at each end flexibly attached to the casing, with a pair of necked down portions. The necked down portions are of such reduced diameter that the vibration of the rod is not coupled into the casing. Preferably, the nodal points are adjusted to coincide with the flexible connections.

The vibrating rod is provided with weight element preferably in the form of circular disks which are symmetrical about its longitudinal axis. The weight elements may be provided with means to trim the center of gravity, or may be adjusted on the rod, so that they may be selectively positioned to establish the vibrating nodes at predetermined points exterior to the vibrating element.

The angular direction sensor includes pick-off systems, drive systems and torquing systems, for sensing the angular relationship between the plane of vibration with respect to the case, and for starting, maintaining and modifying the vibration.

Full details of the present invention are set forth in the following description of the preferred embodiments and are illustrated in the accompanying drawings.

BRIEF DESCRIPTION OF THE DRAWINGS

In the Drawings:

FIG. 4 is a sectional view of a modified device embodiment of the present invention, FIG. 5 is a sectional view taken along line 5—5 of FIG. 4, FIG. 6 is a circuit diagram for the operation of the device shown in FIG. 4.

DESCRIPTION OF INVENTION

Figure 1:
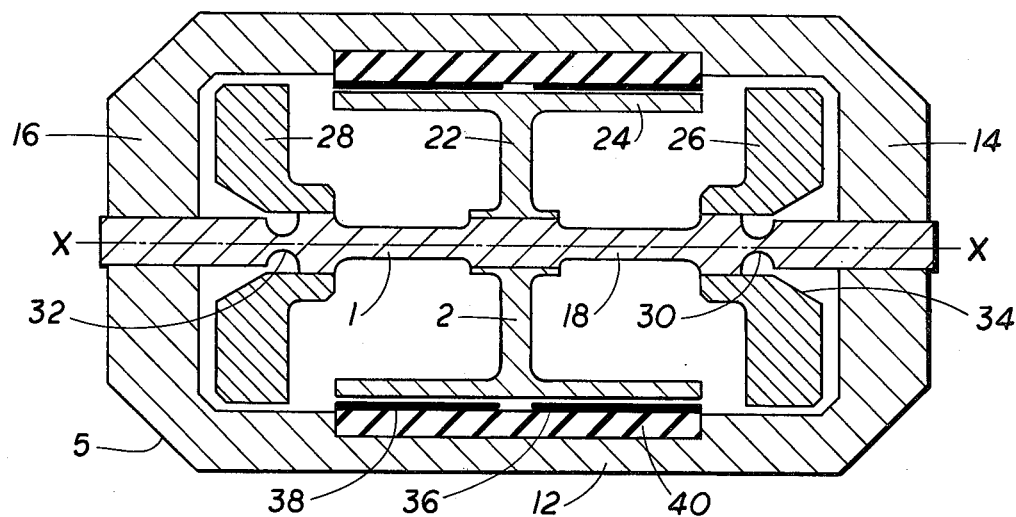
FIG. 1 is a section through the center of an angular direction sensor embodying the present invention.

As illustrated in FIG. 1, the spatial indicator device may essentially comprise a hollow, cylindrical casing 5 which is adapted to be secured to a mounting support or base (not shown) with its longitudinal axis X—X arranged in any pre-defined direction, such as vertically or horizontally. The casing 5 comprises a cylindrical wall 12 enclosed by a pair of end walls 14 and 16. Mounted within the casing 5 is a mechanical resonator comprising an elongated elastic rod 1 and 18 firmly attached at its ends to the walls 14 and 16 to extend along the center line X—X corresponding to the longitudinal axis. At the center of the rod 1 and 18 (i.e., the mid point between the end walls of the casing), is fixed a weight 20 having a I-shaped cross section and comprising a radial disc 22 to which is integrally formed a cylindrical member 24 spaced concentrically within the cylindrical wall 12. The cylindrical member 24 is preferably made of electrically conductive material. Uniformly spaced to either side of the weight 20 are radially symmetrical disc shaped weights 26 and 28. Exterior of the point at wich the flywheels 26 and 28 are each secured to the elastic rod 1 and 18, the spring rod 1 and 18 itself is necked down to a small radial dimension to provide a pair of flexible supporting connections 30 and 32, which allow the central portions of the elastic rod 1 and 18 to flex and vibrate similar to a vibrating string. These central portions are actually the effective elastic portions of the rod. The supporting connections 30 and 32 are designed to support the vibrating parts and constitute the nodal points for the vibrating parts. The exterior surfaces of the weight elements are countersunk or tapered about their centers as indicated at 34.

All parts of the device are symmetrical about the center line X—X, as well as being axially symmetrical to either side of the mid point at which the weights 2 is connected. The weights 2, 26 and 28 and the elastic rod 12 constitute a mechanical resonator. The plane of vibration is the plane of the paper, see FIG. 2. The weights 2, 26 and 28 have both a linear momentum and an angular momentum with respect to the nodal points 30 and 32 within the plane of vibration. The weight 2 has only a linear momentum. The natural frequency of oscillation of the resonator may be determined by equating the kinetic energy associated with the three weights (i.e., of the weights and the spring rod) to the potential energy associated with the flexure of the elastic rod 1, 18; that is, the frequency of the oscillation of the resonator can be determined by the inertial and mass of the weights and the spring rate of the elastic rod 1, 18. Once the device is set into vibration it acts much like a Foucault pendulum and the plane of vibration will tend to remain rotationally fixed in space, by conservation of linear momentum even though the instrument as a whole may be rotated about the center line. This is made possible by the complete circular symmetry about the center line so that the instrument has no preferred direction of vibration.

In general as the resonator vibrates there will be two points, known as the nodes, which remains stationary in that they may undergo angular motion but no linear motion in the plane of vibration. It has been found that if the moment of inertia of the weights 26 and 28 are made large enough, the nodal points can be made to be completely external to the central portions of the elastic rod 1 and 18 which actually flexes. Preferably, the inertia of the flywheels is determined so that these nodal points coincide with the necked down supporting portions 30 and 32. This makes it possible to support the entire resonator at these flexures, without linear vibrating effect on the case 5. A small angular vibrational moment is coupled from each flexure into the case, due to the angular vibration of the weights 26 and 28. It should however be pointed out, that these moments are of opposite directions and thus cancel each other. By doing this, the flexures permit the resonator to act similar to a "free-free" vibrating beam. Establishing the nodes at these flexures maintains a firm support of the resonator, keeping the resonator rotationally stationary with respect to the case 5. The casing 5 is preferably sealed and its interior evacuated, to avoid interference with the atmosphere and to exclude air damping.

Figure 3:
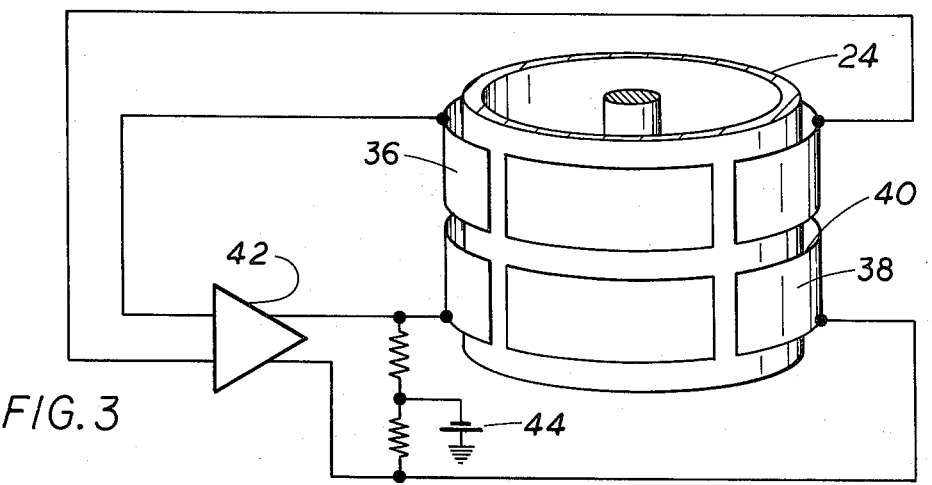
FIG. 3 is an isometric view and circuit diagram of the resonator portion of the device depicted in FIG. 1.

The resonator may be started and maintained in oscillation by a capacitive sensing and driving system. As seen in FIGS. 1 and 3, the capacitive system comprises a set of sensing electrodes 36 and a set of driving electrodes 38, each set comprising four uniformly spaced conductive cylinders secured on an isolating ring 40 embedded in the cylindrical wall 12 of the casing 5. The difference in capacitance between the opposing pair of electrodes 36 is sensed and amplified in a amplifier 42 and applied to opposite pairs of electrodes 38 in such a way as to provide the force necessary on the weight 24 to sustain the vibrations in the resonator. An idential system is connected to the remaining two plates of the electrode sets 36 and 38, respectively. A source of direct current such as a battery 44 is employed to provide the necessary bias for the system. Two orthogonal excitation systems are thus employed, as a result of which the resonator may oscillate freely in any direction. This being the case, the vibratory motion of the resonator is governed only by the law of conservation of linear momentum which states that in the absence of any disturbing force the direction of the initial direction of the plane of vibration will be maintained. The direction of the plane of vibration with respect to the casing 5 is determined by observing the relative amplitude of the motion, that is, the relative amplitude of the vibration as sensed by each orthogonal pair of plates of the sensing electrodes 36. These signals form the output of the resonator and thus the output of the angular direction sensor. An angular rotation of the case 5 about the axis X—X can thus be determined.

The chief advantage of this system over other vibratory angular motion sensor systems is that the present system senses the input angle rather than the angular velocity. The plane of vibration is largely inertially fixed. Thus, the present instrument is eminently suitable for operation in an inertial platform. There are three distinct features in the present design that permits sensing the input angle rather than the angular rate. These features are: (a) the complete symmetry of the apparatus; (b) the low damping of the resonator; and (c) the low natural frequency of the resonator. The instrument is designed with complete symmetry about the central axis X—X, as well as transversely along the central axis. Low damping is achieved by the unusual design of the resonator which permits the nodal points to be outside, that is, exterior of the flexing or vibrating elastic rod. Only that portion of the elastic rod lying between the nodes 30 and 32 actually flex. The portion of the elastic rod outside each of the nodes and its supports within the end walls of casing 5 is not subject to either linear or angular movement, in the plane of vibration and remains virtually stationary. The simple flexure created by the necked down section of the elastic rod contains the flexing of the elastic rod solely between the nodal points, while supplying a firm and fixed support for the resonator. Furthermore, the present arrangement provides the desired characteristics of maximum angular compliance combined with minimum linear compliance. Because of the high angular compliance, very little energy is stored in the necked down support, that is, the flexing of the elastic rod does produce a quite small reaction moment in the portions ofthe elastic rod outside the nodal points, and thus energy losses into the casing is minimized. The reaction moments in each end of the casing 14 and 16 are not only quite small, but their directions are such that they mutually cancel each other. No vibrations, angular or linear, are therefore transmitted to the mounting support or base.

It can be shown that the accuracy of this instrument is inversely proportional to the operating frequency, all other things being equal. Thus, the design of the inertial weights 22, 26 and 28, is such as to permit a relatively low natural frequency, for example, about 300 Hz. The low natural frequency and the external nodal points are both made possible by the use of the weight elements located at the end of the elastic rod, which elements have relatively high moments of inertia. The design of the weight elements can be chosen within a very broad range and may be made of any material providing sufficient weight and moment of inertia. As a result the weight and density of the elastic rod is totally unimportant. The material in the elastic rod can therefore be choosen to provide extremely low damping and stability and thus increase the accuracy of the sensor. The design of the weight elements can be made so that their inertia and center of gravity can be adjusted or modified without the need to replace the weights or the elastic rod as a whole. Thus the weight elements can be provided with a plurality of adjustment screws uniformly spaced about the exterior of the weights and which are radially moveable to vary the inertia of the weights. The trim screws may also be axially moved to change the axial position of nodal points to coincide with the flexible supporting connections 30 and 32. In this manner, each of the weight elements may be equalized with respect to the other and the inertia be adjusted to obtain an identical resonant frequency for vibration in all planes.

Returning to the FIG. 2, it will be seen that while the resonator acts likes a conventional gyroscope, its linear momentum varies with time. The momentum thus created tends to be conserved such that the momentum vector lags an input rotation around the center line X—X of the elastic rod by a fixed amount. The frequency of the oscillation of the resonator is determined as previously stated only by the inertia of the weights and the spring rate of the elastic rod. Furthermore, the instrument is inherently insensitive to external vibration and insensitive to variances in dynamic impedance in the external mounting of the structure. As noted previously, the interior of the casing is preferably evacuated. This minimizes energy losses due to any damping effect caused by gas trapped within the casing. Mechanical losses in the resonator can be compensated for by the addition of energy from the outside, as, for example, by the use of a capacitivly coupled electric forcer or torquer. In order to minimize unwanted torques, a parametric drive arrangement may be used.

FIG. 4 illustrates a preferred modification of the device embodying a parametric drive and in which the centrally mounted weight element has been deleted.

A particular advantage of this embodiment is achieved by increasing the length of the instrument and by a modification of the flywheels in FIG. 1. It should be emphasized again that the instrument in this configuration behaves like a Focault pendulum in that the plane of oscillation is inertially fixed. This is so because the weights now move in a rectilinear rather than rotary fashion. A further advantage is that the spring can be made longer. All things equal, the performance of the instrument is proportional to the volume of the spring. A further advantage is that the inertia to mass ratio of the flywheel is twice as large in this configuration as that previously described and the plane of vibration is nearly inertially fixed, because of the small inertia about axis X—X associated with this embodiment. In other respects the embodiment of the figure is structurally and functionally the same.

Figure 2:
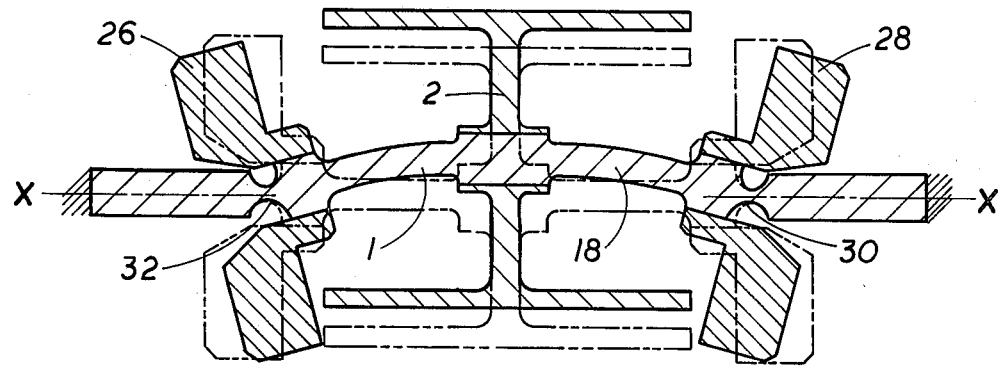
FIG. 2 is an enlarged diagramatic section of the resonator of FIG. 1 showing its mode of vibration.

As seen in FIGS. 4–6, the device comprises a casing 10 in which the resonator comprises a elastic rod 18 on which ends two weight elements 26 and 28 are secured. The elastic rod 18 is provided with a pair of necked down portions 30 and 32, all of similar construction and function as shown in FIGS. 1–3. The weight elements are processed to obtain a conductive surface or made of a conductive material. No centrally mounted weight element is provided however. The parametric drive comprises a capacitive pickoff to which a polarization voltage is provided from a voltage source 62, connected to the pick-off plates by four high resistance resistors 58, 59, 60 and 61. Located adjacent to the weight element 28 are the four sensing electrodes 51, 52, 53 and 54. These sensing electrodes are arranged in an annular ring about the center line X—X, axially and concentrically aligned with the outside diameter of the weight element 28. The four electrodes are mounted inside an electrically insulating ring. The electrodes are connected in diametrically opposed pairs to the opposite terminals of differential amplifiers 56 and 57. The output 63 and 64 from these amplifiers constitute the readout signal from the angular direction sensor. The output is in fact a resolver signal, with the carrier frequency being the resonant frequency of the resonator.

To the exterior of one flywheel (the left one as seen in FIG. 4) a continuous annular ring electrode 71 is provided, through which parametric drive may be obtained. The parametric drive signal is described by the following way: the resolver output 63 and 64 is multiplied in the multipliers 65 and 66. The signal is then summed in amplifier 67. The proper phase is arrived at in a 90° lag filter 68. Amplifier 69 feeds transformer 70, which secondary is attached to ring electrode 71.

Proper DC voltage bias on electrode 71 is accomplished by means of a high voltage amplifier 73. The input to this amplifier is connected via a precision AC/DC converter 72 to the output of the summing amplifier 67. Input 74 acts as a reference input to amplifier 73 and serves to establish a proper and constant vibration amplitude.

Start up of the vibrations is accomplished by means familiar to those skilled in the art. The pick-off electrodes 51, 52, 53 and 54, the ring electrode 71 are fixedly mounted in the casing 10 by conventional means so that all electrodes are isolated from the case. The structure of the device, that of the elastic rod 18 and the weight elements 26 and 28 and their mounting within the casing 10 as shown in FIG. 4 is otherwise similar to that shown in the preceding embodiment. In this embodiment, the weight elements may be provided with trim screws, or adjustable weights, etc. to vary the effective nodal point and to adjust the inertia.

While the material from which the elastic rod is made, its effective length (between necked down connections) and its diameter will all contribute to its flexibility or lack of flexibility, the proper structure and choice of materials will present no problem to those skilled in the art in obtaining a resonator having sufficient vibrating amplitude for sensing. The choice can be made within a wide range, since the sensor detect angular rotation with respect to a given or predetermined plane of vibration, rather than angular velocity, frequency or other high variable and quantitiative parameters. Thus, even the slightest vibration amplitude enables accurate angular measurement to be sensed. Consequently, the effective length of the elastic rod in the resonator may be made short. Preferably, however, the effective length of the elastic rod should be long relative to the instrument as a whole and the moment of inertia of the weight elements should be relatively high. As a result, quite low resonant frequencies, for instance 100 Hz, are made possible.

While the weight elements are illustrated as being secured to the rod and provided with trim screws, it will be obvious that they may be slidably adjustable along the rod, as being provided with mating keys and keyways or splines. In any event, a feature of the present invention lies in the separation of the vibratory element (i.e., the rod 18) and the inertial elements (weight elements) so that the precise adjustment can be made to place the nodal points exterior of the vibrating element. In this manner, the resonator can be held at each of its ends in a fixed and stable mount, which is insensitive to vibration, and to structure the resonator so that the nodes appear at the mount, which in this instance comprises necked down connecting portions of the rod, flexible to bending but not to linear motions. It will be noted further that no bearings are required to mount the rod, nor is the rod required to be rotated by a motor or other physical drive means. As a result, the present device is a simple true angular direction sensor rather than a angular rate sensor. None of the parts in the sensor are subjected to wear. Nor does the instrument employ parts or mechanisms that have a limited life.

Various modifications and changes have been suggested. Others will be obvious to those skilled in this art. Therefore, it is intended that the present disclosure be viewed as illustrative only of the present invention and not limiting in any manner.

What is claimed is:

1. An angular direction sensor comprising a housing, an elastic a rod located to oscillate within said housing, said rod being supported at each end by a flexible connection within said housing comprising a pair of spaced necked down portions formed in said rod inwardly of the ends, a pair of spaced weight elements concentrically secured to said rod providing an inertial moment establishing the nodal points of oscillation exterior of said rod, means for exciting said rod to oscillate in a predefined plane, and pick-off means for providing a signal which varies as a function of the angular relationship of the plane of vibration with respect to the housing.

2. The sensor according to claim 1, wherein said nodal points and said flexible connections coincide.

3. The sensor according to claim 1, wherein said weight elements are symmetrically secured to said member to establish said inertial moment.

4. The indicator according to claim 3, wherein said inertial elements are adjustable with respect to said member to enable adjustments of said nodal points.

5. The sensor according to claim 1, wherein said pick-off and exciting means comprises a plurality of sensing electrodes spaced uniformaly about said rod and a plurality of driving electrodes spaced uniformly about said rod, and means for exciting said rod to oscillate in any plane, unrestricted by the location of said electrodes.

6. The sensor according to claim 5, wherein said electrodes comprise at least two sets of orthogonally arranged paired electrodes.

7. The angular direction sensor according to claim 6, including means for controlling the drive current as a function of the pick-off signal to maintain said rod oscillating at a constant amplitude.

8. The angular direction sensor according to claim 6, including a cylindrical conductive ring secured to said rod between said weight elements, said electrodes comprising arcuate plates fixed in said housing and surrounding said ring.

9. The angular direction sensor according to claim 5 comprises two pairs of electrodes, each pair being arranged perpendicularly to each other, and connected to a voltage bias source by means of resistors.

* * * * *